March 9, 1965     A. W. SCHULTZ     3,172,392
HOG FARROWING HOUSE
Filed Nov. 30, 1962     3 Sheets-Sheet 1
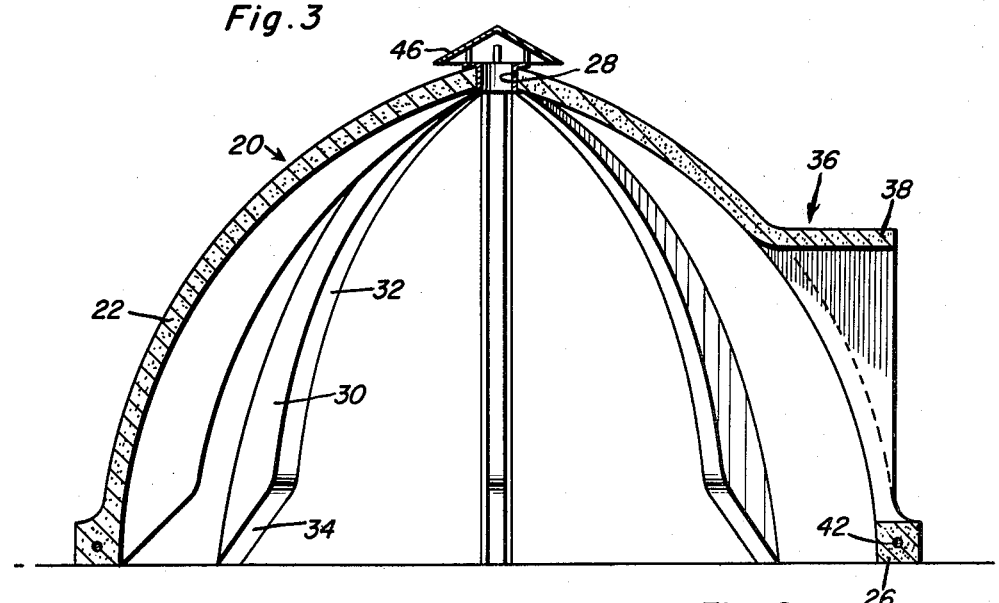
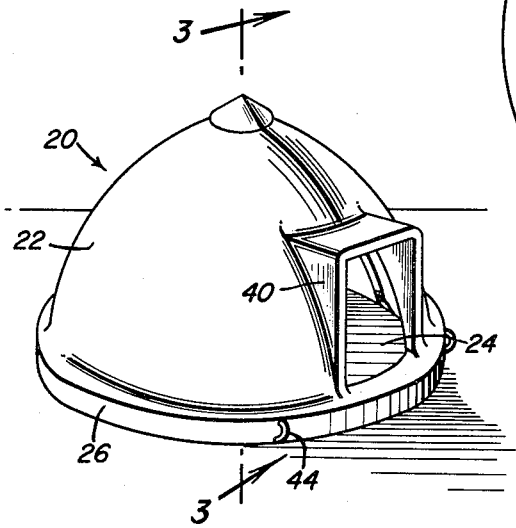
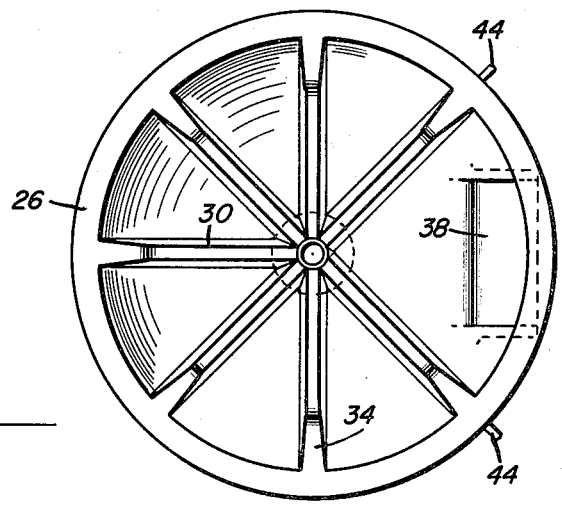
Alfred W. Schultz
INVENTOR.

March 9, 1965  A. W. SCHULTZ  3,172,392
HOG FARROWING HOUSE
Filed Nov. 30, 1962  3 Sheets-Sheet 2
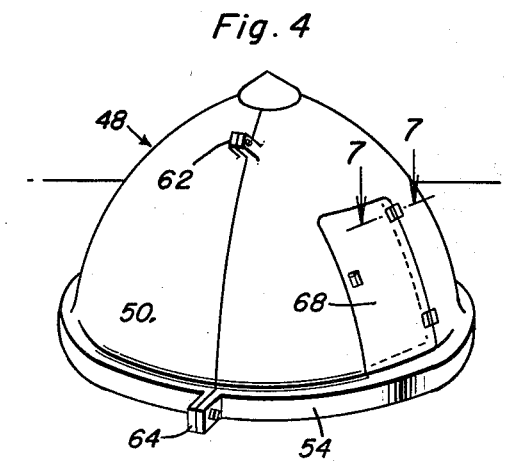
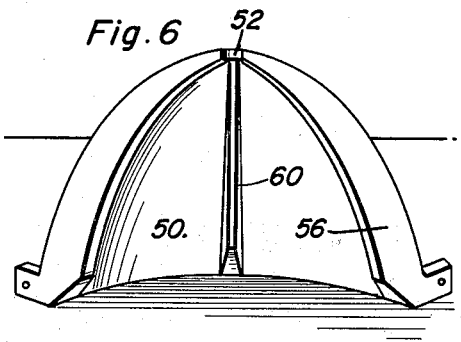
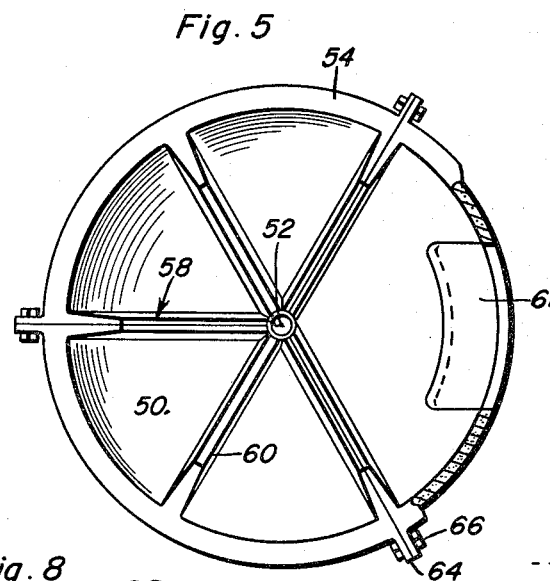
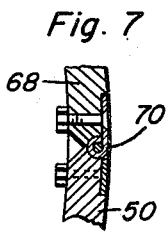
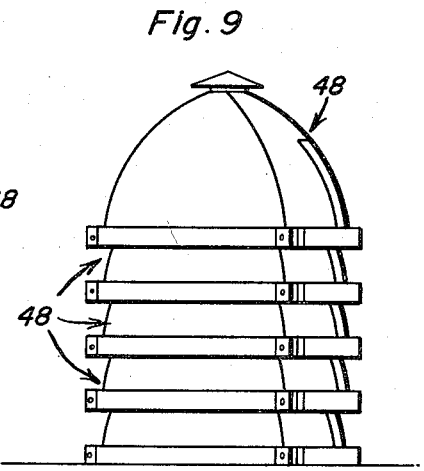
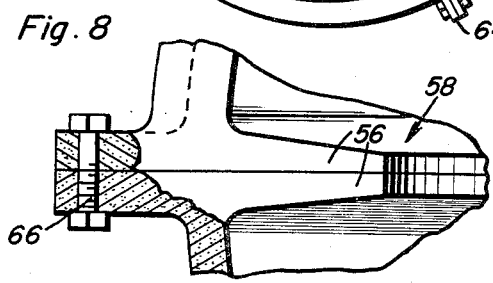
Alfred W. Schultz
INVENTOR.

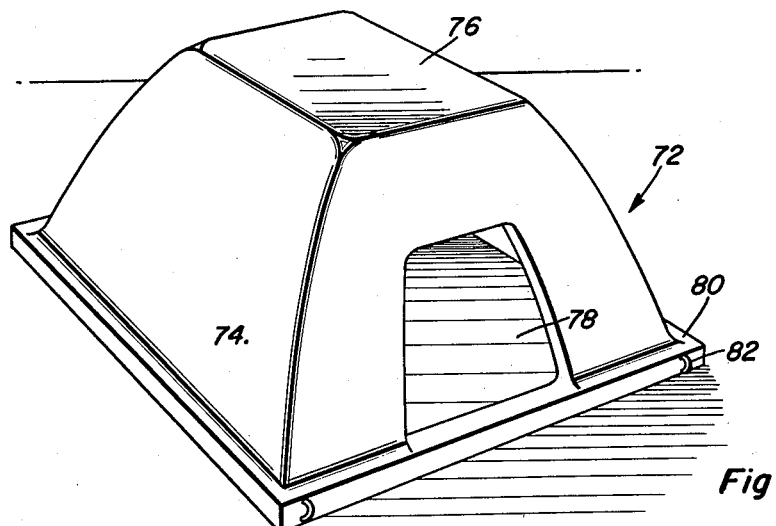
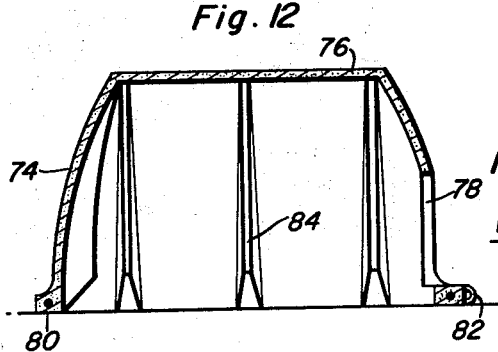
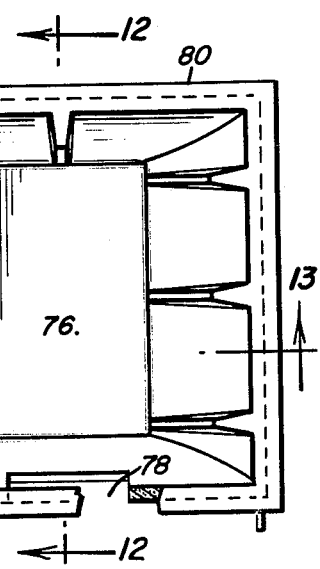
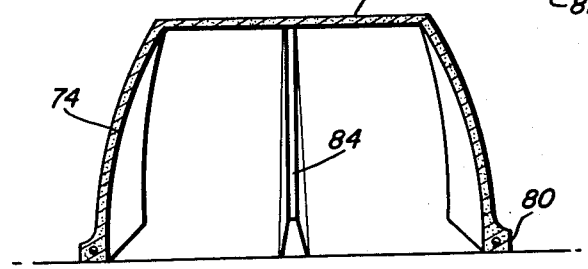
Alfred W. Schultz
INVENTOR.

United States Patent Office 3,172,392
Patented Mar. 9, 1965

3,172,392
HOG FARROWING HOUSE
Alfred W. Schultz, 1007 North Shore Drive,
Clear Lake, Iowa
Filed Nov. 30, 1962, Ser. No. 241,309
11 Claims. (Cl. 119—20)

The present invention generally relates to farrowing houses, and more particularly to a novel portable precast concrete farrowing house for animals such as hogs.

As will be appreciated by those familiar with hog production, various standards must be met as economically as possible if a successful operation is to be maintained. However, many of the different types of farrowing houses now in general use either fail to provide the necessary protection and sanitary surroundings required, or, they involve costs which put them beyond the reach of the small producer.

Accordingly, it is one of the primary objects of the present invention to provide an economical precast farrowing house which, in addition to providing a complete enclosure for the protection of the animals, is constructed so as to easily be maintained in a sanitary condition, thus reducing to a minimum any disease which might result in a stock loss.

In accomplishing the above object, the present invention contemplates the provision of novel precast farrowing houses incorporating safety features so as to prevent any possibility of the mother sow crushing the newly farrowed piglets and being capable of ready movement from one location to another, either by nesting a plurality of the houses and transporting the entire group, or individually towing each unit, suitable tow cable attaching means being provided.

Another object of the present invention is to provide a weather-tight structure of an extremely durable nature capable of being maintained with a minimum expenditure of both time and effort.

Likewise, it is contemplated that the vertically extending integrally formed ribs, which are intended to provide the desired protection for the piglets, also function so as to strengthen the overall structure.

Additionally, it is contemplated that the precast farrowing house of the present invention be provided with an encircling reinforcing beam or collar about the lower periphery thereof, this collar strengthening the structure so as to enable it to be dragged over the ground from one location to another by a towing vehicle.

Another object of the present invention resides in the provision of a farrowing house which is constructed of a plurality of precast sections, thus reducing the forming costs and facilitating the transportation thereof when the towing of the complete house is not feasible. However, it will be appreciated that the present invention also contemplates the towing of the assembled sections.

Another object of the present invention involves the inclusion of an opening through the uppermost portion of the farrowing house, this opening providing ventilation, allowing access to the interior of the house for various purposes such as the insertion of a heat lamp, and providing a means for facilitating the vertical lifting of the house such as might be required during the nesting of several similar houses.

These together with other objects and advantages which will become subsequently apparent reside in the details of construction and operation as more fully hereinafter described and claimed, reference being had to the accompanying drawings forming a part hereof, wherein like numerals refer to like parts throughout.

FIGURE 1 is a perspective view of a farrowing house contemplated by the present invention;

FIGURE 2 is a bottom plan view of the house of FIGURE 1;

FIGURE 3 is an enlarged cross-sectional view taken substantially on a plane passing along line 3—3 in FIGURE 1;

FIGURE 4 is a perspective view of a modified form of farrowing house;

FIGURE 5 is a bottom plan view of the house of FIGURE 4;

FIGURE 6 is a perspective view of one of the segments used in the construction of the house shown in FIGURE 4;

FIGURE 7 is an enlarged partial cross-sectional view taken substantially on a plane passing along line 7—7 in FIGURE 4;

FIGURE 8 is an enlarged partial view illustrating the manner in which the segments are secured together;

FIGURE 9 illustrates the manner in which the present invention contemplates the nesting of a plurality of the houses;

FIGURE 10 is an enlarged perspective view of still a further modified form of farrowing house;

FIGURE 11 is a bottom plan view of the house of FIGURE 10;

FIGURE 12 is a cross-sectional view taken substantially on a plane passing along line 12—12 in FIGURE 11; and FIGURE 13 is a cross-sectional view taken substantially on a plane passing along line 13—13 in FIGURE 11.

Referring now more specifically to the drawings, and with particular reference to FIGURES 1-3, reference numeral 20 generally indicates one of the farrowing houses of the present invention. This farrowing house 20 consists of a dome shaped enclosure 22 provided with an access opening 24, a reinforcing beam 26 integrally formed about the lower periphery of the dome, and a vertically extending opening 28 through the apex of the dome 22.

Located within the dome shaped enclosure 22, are a plurality of ribs 30 circumferentially spaced about the dome 22 and projecting radially inward toward the center thereof. These ribs 30 extend substantially vertical from the dome apex to the lower edge thereof with the inner edge 32 of each rib being arcuately curved so as to approximate the curve of the dome, the rib decreasing in width as the apex is approached. The lower end 34 of each rib 30 is beveled or angled so as to extend upwardly and inwardly from the lower periphery of the dome 22, thus providing, in effect, a passageway beneath the lower end of each rib 30, it being contemplated that this passageway be sufficient so as to allow for the passage of a baby piglet therethrough. Further, it will be appreciated that these ribs 30 are to be of a width, especially toward the lower portion thereof, sufficient so as to provide a space for the safe accommodation of the piglets, the mother sow being limited by the ribs so as to prevent any accidental crushing of the piglets. The peripheral spacing of the ribs 30 will of course have to be such as to prevent the entrance of a portion of the sow therebetween and thus provide the desired safe zone.

The access opening 24 is to be of a size so as to readily receive the sow. In order to exclude the elements, it is contemplated that a weather shield 36 be provided about the access opening. This weather shield 36 includes a horizontal top portion 38 and two vertical side portions 40. If deemed necessary, a door or other suitable type of closure can also be provided.

The beam or collar 26 provided about the lower edge of the dome 22, and internally reinforced by rods 42 if necessary, is formed flush with the interior of the dome 22 and projects beyond the outer surface thereof, thus rigidifying the dome and providing the extra strength required when the dome is to be transported, particularly in those instances when it is to be dragged across the ground. This dragging of the dome is to be accomplished by any conventional towing vehicle, the tow cable of which is to be attached to suitable imbedded anchor loops 44 peripherally located about the beam 26.

The opening 28 provided through the apex of the dome 22, in addition to providing for the ventilation of the interior of the dome 22, with a suitable weather cap 46 being used, also functions as a means for both obtaining access to the interior of the closure for various purposes such as the introduction of a heat lamp, and as a means for attaching a lifting device to the dome for the vertical lifting thereof.

As will be appreciated from the drawings, the entire structure as set forth supra, aside from the weather cap 46, is intended to be integrally formed as a single precast unit, thus greatly reducing manufacturing costs and providing a monolithic structure which can easily be maintained in a clean and sanitary condition with a minimum amount of effort.

Turning now to FIGURES 4–8, it will be noted that a modified form of farrowing house 48 has been illustrated therein. This farrowing house 48, illustrated as dome shaped but not necessarily limited thereto, is constructed of a plurality of precast segments or sections 50. These sections 50, the present invention contemplating the use of any reasonable number of sections 50, are each provided with an arcuate notch 52 at the apex end thereof so as to form an opening similar to opening 28 when the sections are assembled, and an arcuate outwardly extending beam 54 integrally formed with the lower edge of each section 50 forming a reinforcement therefor and cooperating with similar beams 54 on the other segments 50 so as to form a circular collar such as the collar 26 in the house illustrated in FIGURES 1–3. Further, each sector 50, along the vertical edges thereof, is provided with an inwardly projecting half rib 56 complementing a similar half rib on an adjacent sector 50 so as to form a complete rib 58 as best seen in FIGURES 5 and 8. If so desired, full size ribs 60 can be also provided in each precast section 50 between the half ribs 56, both the ribs 58 and the ribs 60 being similar in shape and purpose to the ribs 30.

In order to secure the segments 50 together so as to form a complete enclosure, outwardly projecting lugs 62 and 64 are provided, the lugs 62 being located on the sections 50 near the upper portion thereof, and the lugs 64 projecting outwardly from the beam sections 54, suitable means 66 extending through apertures within the lugs so as to bolt the sections together. It will be appreciated that such an arrangement allows the transporting of the houses 48 either in an assembled or a disassembled condition depending on the surrounding circumstances. Also, the house 48, being reinforced by the beams 54, can, if so desired, be dragged over the ground in a manner similar to that used in moving the houses 20, the towing cable being attached to the lugs 64 or other suitably provided attaching rings.

Access to the interior of the house 48 is provided through an opening preferably closed by a hingedly mounted door 68 provided on one of the sections 50. One suitable type of door mounting means 70 is illustrated in section in FIGURE 7.

It is contemplated that the door means 68 be mounted flush with and follow the curvature of the exterior surface of the section 50 so as to facilitate the nesting of the houses 48 as illustrated in FIGURE 9, this nestability also requiring the curvature of the inner edge of the ribs 58 and 60 so as to substantially conform to the curvature of the sections 50. It will of course be appreciated that the present invention also contemplates the nesting of integrally formed houses such as that illustrated in FIGURES 1–3, the elimination of the weather shield 36 being necessary to obtain this nesting feature.

FIGURES 10–13 show a further modified form of farrowing house 72, illustrated as having four sides 74, but not specifically limited thereto, the use of any reasonable number of sides so as to form a complete enclosure being contemplated. The house 72, integrally formed substantially in the same manner as the house 20, includes a flat roof portion 76, an access opening 78 and an outwardly projecting reinforcing peripheral beam or collar 80 having tow cable attaching loops 82 imbedded therein.

The walls 74, as will be appreciated from the drawings, are upwardly and inwardly arced so as to provide a reduced upper portion to the house 72, thus allowing for its nesting with similar houses somewhat in the manner illustrated in FIGURE 9. Also, it will be recognized that this inward curving of the walls 74, as was also the case with the domed structures, provides a lower section adjacent the walls which is restricted in height so as to present a space for the piglets which is too small to receive the mother sow, this space being further enlarged and protected by the vertically inwardly extending ribs 84 within the house 72 in the same manner as the ribs 30, 58 and 60 in the houses 20 and 48. It will be noted that the ribs 84 are formed in substantially the same manner as the previously described ribs. If so desired, an opening similar to opening 28 can also be provided through the roof portion 76 of the house 72 for similar purposes.

In view of the foregoing, it is considered to be readily apparent that novel precast farrowing houses have been described which in addition to incorporating all of the desirable features of portability and reduced maintenance costs, also provide a structure which can be easily cleaned and maintained in a sanitary condition, the houses also incorporating novel pig saving ribs so as to prevent any accidental injury to the piglets.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A farrowing house consisting of an integrally formed concrete enclosure including walls and a roof, a plurality of inwardly projecting ribs integral with said walls at spaced locations about said enclosure, said ribs projecting inwardly a distance so as to provide spaces between the inner edges thereof and the walls sufficient for the safe accommodation of the newly farrowed animals, the lower end of each rib being angled so as to extend upwardly and inwardly from the lower edge of said wall to a height at the inner limit thereof sufficient so as to allow the passage of the newly farrowed animals beneath the inner portion of this lower end.

2. The structure of claim 1 including a peripheral reinforcing collar integrally formed with and projecting outwardly from the lower edge of said walls.

3. The structure of claim 2 including tow cable attaching means mounted on said collar.

4. A farrowing house comprising an enclosure including an peripheral wall, and a plurality of inwardly projecting ribs on said wall at spaced points about the inner surface thereof, said ribs projecting inwardly a distance so as to provide spaces between the inner edges thereof and the walls sufficient for the safe accommodation of newly farrowed animals, and passageways beneath said ribs so as to allow the passage of the animals between said spaces.

5. The structure of claim 4 wherein the lower end of each rib is angled so as to extend upwardly and inwardly from adjacent the lower edge of said wall to a height at the inner limit thereof sufficient so as to allow passage of the newly farrowed animals therebeneath, thereby forming said passageways.

6. The structure of claim 5 wherein said wall is formed of a plurality of releasably interconnected sections.

7. The structure of claim 5 wherein said enclosure is dome-shaped.

8. The structure of claim 5 wherein said peripheral wall consists of a plurality of angularly related sides.

9. A farrowing house comprising a concrete enclosure including a substantially vertical surrounding wall and a plurality of vertically extending inwardly projecting ribs on said wall at spaced points therealong, said ribs projecting inwardly a distance so as to provide spaces between the inner edges thereof and the wall sufficient for the safe accommodation of newly farrowed animals, the lower end of each rib being formed so as to allow the passage of the newly farrowed animals therebeneath.

10. The structure of claim 9 wherein the inward projection of said ribs decrease upwardly from the lower ends thereof.

11. The structure of claim 10 wherein the lower end of each rib is formed so as to extend upwardly and inwardly from adjacent the lower edge of said wall to a height at the inner limit thereof sufficient so as to allow the passage of the newly farrowed animals beneath the inner portion of this lower end.

References Cited in the file of this patent
UNITED STATES PATENTS

| | | |
|---|---|---|
| 2,460,662 | Van Voorhis | Feb. 1, 1949 |
| 2,649,101 | Suits | Aug. 18, 1953 |
| 2,732,826 | Dawson | Jan. 31, 1956 |
| 2,740,379 | Collins | Apr. 3, 1956 |
| 2,755,770 | Rudemann | July 24, 1956 |
| 2,782,758 | Turner | Feb. 26, 1957 |
| 2,958,918 | MacMillan | Nov. 8, 1960 |
| 3,026,844 | Spindler | Mar. 27, 1962 |